Nov. 10, 1931.   H. J. HANZLIK   1,831,242
LABYRINTH PACKING
Filed Dec. 9, 1926

WITNESS
E. Lutz

H. J. Hanzlik
INVENTOR

BY a. B. Reavis
ATTORNEY

Patented Nov. 10, 1931

1,831,242

UNITED STATES PATENT OFFICE

HENRY J. HANZLIK, OF SWARTHMORE, PENNSYLVANIA, ASSIGNOR TO WESTINGHOUSE ELECTRIC & MANUFACTURING COMPANY, A CORPORATION OF PENNSYLVANIA

LABYRINTH PACKING

Application filed December 9, 1926. Serial No. 153,668.

My invention relates to labyrinth packing for sealing the joint or clearance between a stationary and a rotating member, and it has for its object to increase the effectiveness thereof.

Another object is to reduce the possibility of damage from excessive heating due to accidental rubbing.

Labyrinth gland packing is commonly used as a fluid seal between the stationary structure and the rotor of an elastic fluid turbine; for example, between the dummy piston and the dummy ring, and between the spindle and the casing. Such packing embodies a large number of projections or packing elements on either the stationary or the rotating members, or, as is common, on both of said members, the elements being arranged in pairs with close clearance therebetween.

In accordance with my invention, I increase the resistance of the packing to the flow of fluid by providing projections or grooves, or both, which deflect the fluid from the leakage points or clearances, causing it to follow a tortuous path. I may also corrugate or serrate the surfaces of the packing elements and the members to further resist the leakage flow by friction.

I also reduce the opportunity for excessive heating and consequent damage due to accidental rubbing by providing narrow connecting portions for free ends of the packing elements. This reduces the material through which heat may be conducted and also increases the heat radiating surfaces.

Figure 1:
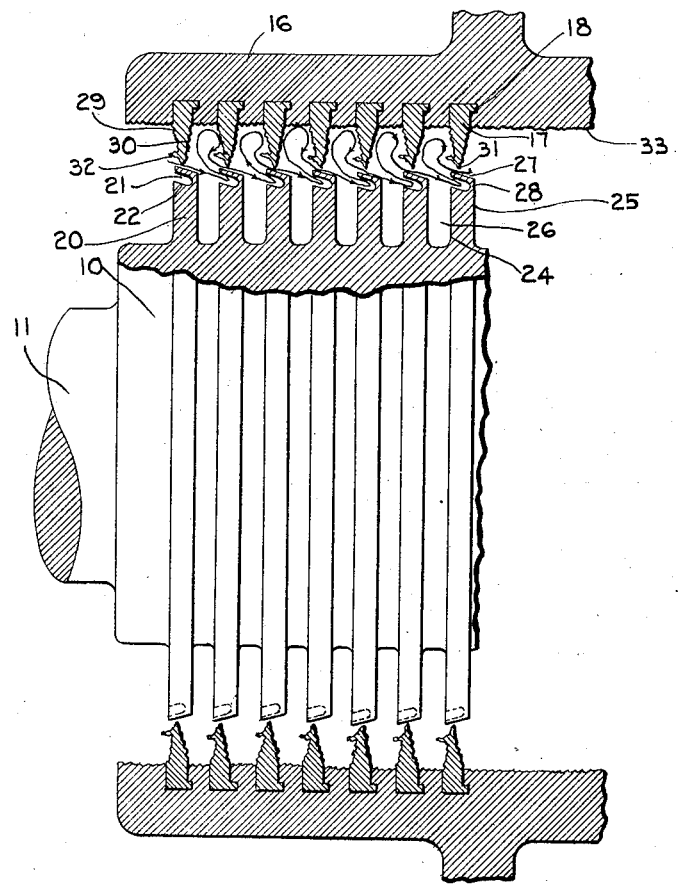
Figure 2:
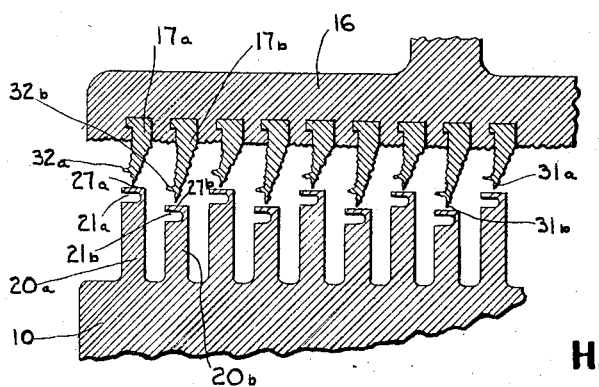

My invention is illustrated in the accompanying drawings; in which,

Fig. 1 is a view, partially in section, of one form of labyrinth packing embodying my invention; and, Fig. 2 shows, in section, a modified form of packing.

Referring to the drawings in detail, I show by way of illustration a dummy piston or cylinder 10, forming a part of the turbine rotor 11, and having packing elements 20 thereon which may be formed integrally therewith. Surrounding the dummy piston 10 is a dummy or carrier ring 16, secured in any suitable manner in a turbine casing (not shown), and carrying the packing elements 17, secured therein in any suitable manner as by flanges 18. The elements 17 register and cooperate with the packing elements 20 to prevent or reduce to a minimum leakage of fluid between the dummy piston and dummy ring.

The packing elements 20 are shown as having parallel side surfaces 24 and 25. The space 26 between adjacent elements permits expansion thereof in case of overheating due to accidental rubbing and also provides space for a medium to which the heat may be radiated from the surfaces 24 and 25. The peripheral surface 27 of each element 20 is inclined inwardly in the direction of leakage flow, the line thereof falling intermediate the outer and inner peripheries of the next element 20. Each element 20 has cut therein a groove 21 on the side 24, the inner side 22 thereof being in approximate alignment or registry with the surface 27 of the preceding element 20. The bottoms of the grooves are curved and the outer sides are preferably parallel to the inner sides. Each groove 21 extends across the greater portion of the width of an element 20, leaving only a narrow neck portion 28 for connecting the peripheral portion to the body of the packing element.

The packing elements 17 carried by the dummy ring extend inwardly toward the dummy piston 20, the sides 29 and 30 thereof converging to an edge 31, which is disposed in close proximity to the surface 27 of the adjacent element 20. The elements 17 are provided with projections 32, disposed near the edges 31 and on the side 29 from which the leakage flows.

To further resist the flow of fluid through the packing structure, I have shown the sides 29 and 30 of the elements 17 and the adjacent surface 33 of the dummy ring 16 as serrated or corrugated, providing frictional resistance to the flow of the fluid.

The operation of the above construction is as follows, the path of the fluid leakage being indicated by the arrowed line on the drawings: The fluid at the left side of the packing structure, being at a greater pressure than that at the right, will tend to flow from left to right. A portion of the fluid will escape between the first pair of packing elements 17 and 20 and will be directed by the inclined surface 27 toward the groove 21 of the next packing element 20. The direction thereof will be reversed by the curved bottom surface of the groove and it will then flow back against the side 30 of the first element 17, then along the surface 33 of the dummy ring and downwardly along the side 29 of the next element 17. As it nears the edge 31, it will again be deflected by the projection 32, causing it again to change its course and flow around said projection before it finally escapes between the second pair of elements 17 and 20, where it will be directed by the inclined surface 27 to flow into the next groove 21 and repeat its tortuous path.

Each groove 21 also performs another function. It separates the peripheral portion of the element 20 having the surface 27, from the body of the element 20, only a narrow neck 28 connecting it thereto. In case of overheating due to any cause, for example, to accidental rubbing, the opportunity for transmitting the heat to the body of the packing element will be greatly reduced due to its narrow width. The groove also provides additional surface from which said heat may be radiated by the peripheral portion.

Another important advantage of the grooves 21 is that they permit a greater width of the elements 20. Due to unequal heating and expansion of the stationary and rotating parts, there will be a relative axial movement between the elements 17 and the elements 20, and the extent of such axial movement during which the elements remain in registry depends upon the width of elements 20. Heretofore it has been necessary to restrict the width of the elements 20 to provide for the radiation of heat upon accidental rubbing. With my construction the grooves 21 provide greater radiating surfaces and also reduce the communicating metal through which heat may be conducted to the body of the elements 20 and to the dummy piston 10. The elements 20 may therefore be made wider to insure registry of each edge 31 with some portion of a cooperating surface 27 at all times.

In Fig. 2, I show a modified form of my invention showing alternating narrow and wide elements 17a and 17b, respectively, which cooperate, respectively with alternating wide and narrow elements 20a and 20b. The peripheral surfaces 27a and 27b of the elements 20a and 20b are substantially cylindrical and cooperate, respectively with edges 31a and 31b of the elements 17a and 17b.

Grooves 21a and 21b are provided at the forward sides of the elements 20a and 20b and the peripheral edges 27b register with the inner surfaces of the grooves 21a. The elements 17a and 17b are provided with forwardly extending projections 32a and 32b and the peripheral surfaces 27a are preferably in line with the outer surfaces of the projections 32b. The interior surfaces of the carrier ring 16 and the surfaces of the elements 17a and 17b are serrated as heretofore described.

Fluid leaking between the edges 31a and the surfaces 27a pursues a whirling or eddying path and finally escapes between the following edge 31b and surface 27b and enters the groove 21a on the next succeeding packing element 20a, fluid being reversed or redirected by the latter to impinge upon the serrated surfaces before escaping between the next edge 31a and surface 27a.

From the above description it will be seen that I have devised a labyrinth packing structure wherein the fluid leakage is required to follow a very tortuous path. Obviously this will retard the flow of such leakage to a very large extent.

It will also be seen that I have reduced the likelihood of damage to the rotor from overheating by increasing the radiating surface and reducing the connecting portion through which such heat may be transmitted to the packing elements of the dummy piston.

While I have shown my invention in two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

I claim as my invention:

1. In a labyrinth packing construction, the combination of a stationary member, a rotatable member, a plurality of packing elements carried by said stationary member, and a plurality of packing elements carried by said rotatable member and registering with the first-mentioned packing elements, one of said packing elements carried by the rotatable member having a groove disposed in the path of fluid leakage from an adjacent pair of packing elements and deflecting said fluid from the clearance between said grooved packing element and its registering packing element, the clearance between the packing elements of said adjacent pair being formed to direct the leakage therefrom into said groove.

2. In a labyrinth packing construction, the combination of a stationary member, a rotatable member, a plurality of pairs of packing elements carried by said members, one element of each pair being carried by the stationary member and the other by the rotatable member, the elements of each pair having a close clearance therebetween, one element of a pair having a groove disposed in the direction of fluid leakage between the elements of the preceding pair and deflecting said fluid from the clearance between the elements of said first pair, the other elements of said first pair having a projection near the clearance between said pair for again deflecting the leakage flow from said clearance.

3. In a labyrinth packing construction, the combination of a stationary member, a rotating member, a plurality of pairs of packing elements carried by said members, one element of each pair being carried by the stationary member and the other by the rotating member, the elements of each pair having a close clearance therebetween, one element of a pair having means disposed in the direction of fluid leakage between the elements of the preceding pair and deflecting said fluid from the clearance between the elements of said first pair, the other element of said first pair having a projection near the clearance between said pair for again deflecting the leakage flow from said clearance.

4. In a labyrinth packing construction, the combination of a stationary member carrying packing elements, a rotatable member carrying packing elements registering and cooperating with the stationary packing elements, one pair of registering packing elements forming a packing constriction which directs the flow of fluid leakage therethrough against the rotatable element of the next pair intermediate the inner and outer peripheries thereof, and a groove in said last-mentioned element for deflecting said flow away from the clearance between the last-mentioned pair of packing elements, said groove being on the side of the element facing the first-mentioned pair of packing elements and being disposed in line with the path of the fluid leakage as it leaves the clearance between the packing elements of the first-mentioned pair.

In testimony whereof, I have hereunto subscribed my name this twenty-third day of November, 1926.

HENRY J. HANZLIK.